May 5, 1959 A. S. LOUIS ET AL 2,885,519
POTENTIOMETER WIPER ARM
Filed Sept. 27, 1956 3 Sheets-Sheet 1
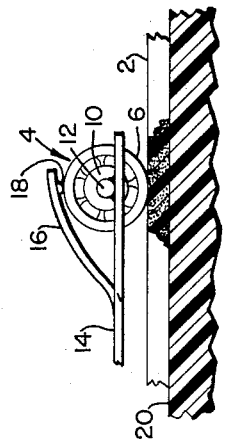
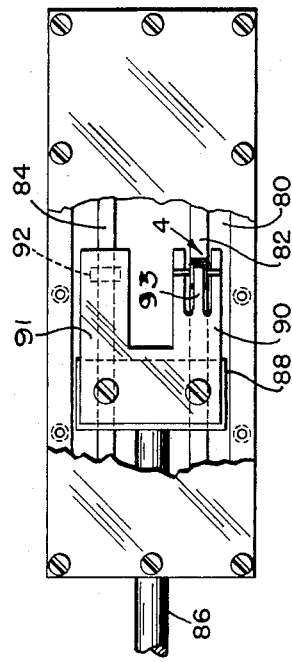
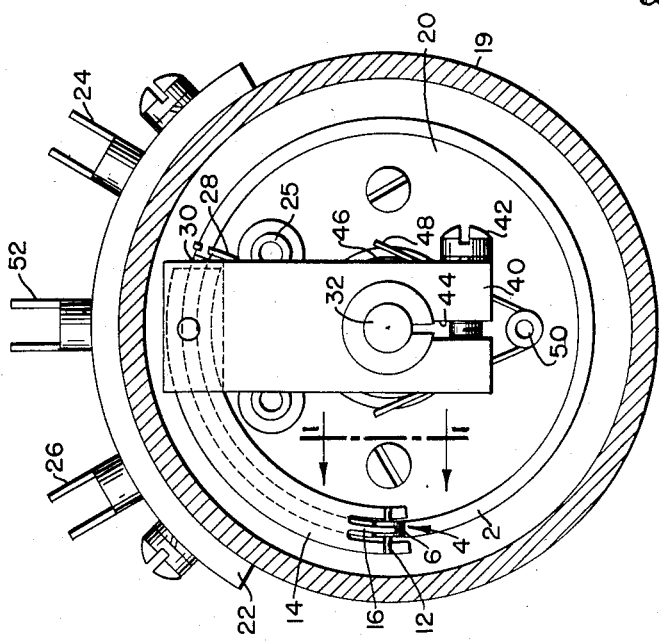
INVENTOR.
HENRY S. ZABLOCKI
ARNOLD S. LOUIS
BY
Leonard H. King
AGENT May 5, 1959

A. S. LOUIS ET AL 2,885,519

POTENTIOMETER WIPER ARM

Filed Sept. 27, 1956

*INVENTOR.*
HENRY S. ZABLOCKI
ARNOLD S. LOUIS

BY

Leonard H. King

AGENT

May 5, 1959  A. S. LOUIS ET AL  2,885,519
POTENTIOMETER WIPER ARM

Filed Sept. 27, 1956  3 Sheets-Sheet 3

*INVENTOR.*
HENRY S. ZABLOCKI
ARNOLD S. LOUIS

BY Leonard H. King
AGENT

United States Patent Office 2,885,519
Patented May 5, 1959

2,885,519

POTENTIOMETER WIPER ARM

Arnold S. Louis, Riverdale, N.Y., and Henry S. Zablocki, Nutley, N.J.

Application September 27, 1956, Serial No. 612,492

16 Claims. (Cl. 201—55)

This invention relates to wipers for variable resistance devices and potentiometers. In particular it refers to such wiper devices having rolling contacts.

In designing a variable resistance device the designer is often faced with two incompatible problems: (1) It is advantageous to utilize low wiper brush pressure in order to reduce friction and thereby reduce the torque or force required to actuate the potentiometer; and (2) The need for high brush pressures in order to reduce contact resistance and noise resulting from low brush pressure.

Attempts have in the past been made to utilize a rolling bearing as the wiper. It was found that high brush pressures could be obtained with little or no effect on the torque or force required to actuate the potentiometer. Actually, in many cases, a reduction in the required torque was measured. However, it was also found that the use of a ball or roller type bearing wherein the outer race served as the wiper resulted in considerable noise since it required the balls or rollers of the bearing to transmit the signal from the outer to the inner race. Such rolling contacts, especially when made from steel, are poor.

There is disclosed hereinafter an improved device which utilizes a wiper type take-off to make contact to the outer race of such a bearing so as to eliminate the need for the ball or roller bearing components to actually transmit the signal.

Accordingly, it is an object of this invention to provide an electric contact making means which results in low frictional drag on an actuating mechanism.

It is another object of this invention to produce a variable wiper mechanism capable of high brush pressure with little frictional loading on the actuating mechanism.

It is a particular object of this invention to provide a low noise variable wiper for variable resistance devices which utilizes a rotatable bearing.

It is still another object of this invention to provide an improved wiper suspension.

It is a further object of this invention to provide an improved rotational potentiometer device.

It is still another object of this invention to provide an improved rectilinear potentiometer device.

Still other objects and advantages of this invention will be in part pointed out with particularity and will in part become obvious as the following description proceeds, taken in conjunction with the accompanying drawings, wherein in the various views like numbers refer to like members.

In the drawings:

Figure 1 discloses, in plan, a roller bearing contact of this invention engaging a resistance element.

Figure 2 shows, in plan, a rotational type potentiometer employing this invention.

Figure 5 shows, in plan with the cover partly broken away, a rectilinear potentiometer incorporating the device of this invention.

Figure 4:
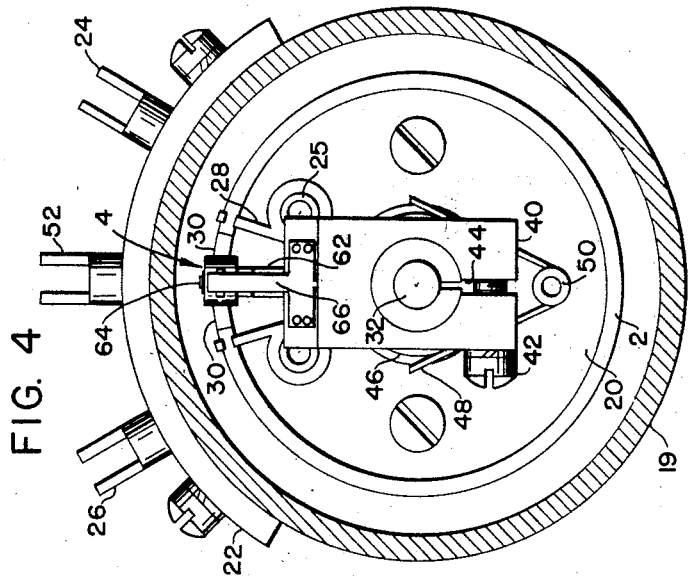
Figure 4 shows, in plan and partly broken away, a rotational type potentiometer corresponding to that shown in the elevational view of Figure 3.

In Figure 1 there is disclosed a roller contact of this invention. Resistance element 2 and roller 4 are engaged in intimate contact. More specifically there is shown the outer race 6 of a ball type bearing in contact with the resistance element. Inner race 10 is mounted on an axle 12 which is secured to leaf spring member 14 as for example by welding or soldering. Leaf spring member 16 which is an integral part of leaf spring member 14, carries a contact member 18. This contact member may be composed of a 90% platinum and 10% palladium alloy or other suitable contact material. The outer race 6 may be coated with pure silver or a coin silver alloy for improved electrical contact. The use of the roller bearing contact permits extremely high brush pressures with low torque loading. There are many suitable contact alloys such as Paliney #7 supplied by J. N. Ney and Co., which may be employed.

Figure 3:
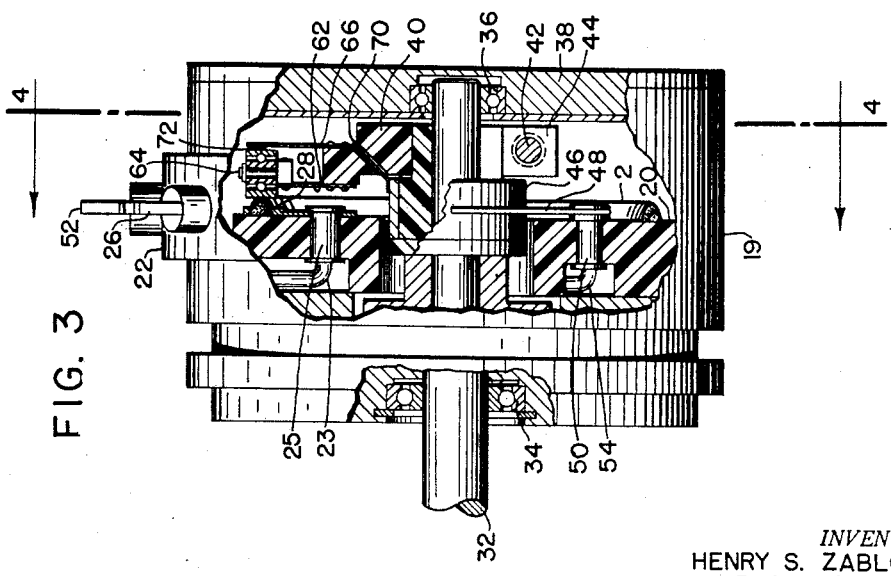
Figure 3 shows, in elevation, a cross-section of another rotational type potentiometer.

In Figure 2 there is shown a rotational potentiometer embodying the instant invention. Casing 19 supports insulator plate 20. Mounted on plate 20 is a resistance element 2. Terminals 24 and 26, extending through insulator plate 22, are connected to the ends of resistance element 2 by means of suitable conductors. Since the cross-sectional view is for the most part common to Figures 2 and 4, reference may be made to Figure 3. A typical conductor is shown in Figure 3 which consists of wire member 23 soldered at one end to terminal 24 and at the other end to hollow rivet 25. In turn rivet 25 is connected by a metallized strip 28 to resistance element 2. The other end of resistance element 2 is likewise connected to terminal 26. In order to permit 360° rotation an insulator portion 30 is interposed between the ends of the resistance element 2 so as to provide a mechanically continuous track. The specific resistance element shown may be a comolded electrically conductive plastic composition or conventional elements such as wire wound or film type resistance elements.

Shaft 32 is rotatably supported in bearings 34 and 36. Bearing 34 is mounted in casing 19. Bearing 36 is press fit into cover 38.

A brush block 40 formed of an insulator material, such as a linen cloth filled phenolic, is secured to shaft by tightening of bolt 42 which deforms the slotted portion 44 of the brush block so as to bind to the shaft. The brush block is therefore rotatable with the shaft 32.

Spring member 14 is supported from brush block 40. Brush block 40 also carries slip ring 46 which is electrically connected to spring member 14. Take-off spring 48 is secured to insulator plate 20 by rivet 50.

The terminal 52 is connected by conductor 54 (visible in Figure 3) to rivet 50 and in turn through take-off spring 48, slip ring 46, spring member 14, contact 18, roller bearing 4 to resistance element 2.

Figures 3 and 4 disclose an alternative method of suspending the roller bearing 4 wherein leaf spring supports roller bearing by means of shaft 64 riveted to the spring 62. Spring member 66 is provided with a conductive strip which is electrically connected between slip ring 46 and contact member 72, composed of a material such as an alloy of Paliney #7 which is a precious metal alloy.

Figure 5 discloses a rectilinear potentiometer incorporating the contact means of this invention. Insulator base 80 supports resistance element 82 and the take-off, which is an electrically conductive strip 84. Shaft 86 actuates brush block 88 which carries spring member 90 which in turn carries roller bearing 4 which makes contact with resistance element 82. Spring 93, joined to spring 90, makes electrical contact with the periphery of roller 4. Wiper 92 carried by spring 91 makes contact with take-off strip 84. For wiper 92 there may be substituted the roller bearing contact of this invention. Cover 96 and case 98 complete the assembly.

While the invention has been described with particular reference to a ball bearing it is to be understood that roller bearings may be likewise employed. More broadly, sleeve bearings may be used in carrying out the invention. What is important is that this invention divorces the problem of bearing materials and bearing design from the problem of transmitting an electrical signal or potential from a resistive track to the wiper arm.

A few examples of excellent anti-frictional bearing systems which are poor transmitters of electrical systems are:
(1) Ball bearing.
(2) Roller bearing.
(3) Sleeve bearing.
   (a) where shaft is metal such as steel and the roller is polyfluoroethylene, nylon, polytrifluorochloroethylene, etc.
   (b) sleeve bearing where the shaft is a hard metal such as steel and the roller a softer metal such as bronze.

By applying the teachings of this invention the foregoing systems become good transmitters of electrical signals.

This invention further permits the use of a precious metal tire on the above listed rollers and the use of precious metal spring contacts. It is to be noted that in some instances the bearing support system is isolated from the take-off system by the bushing.

Figure 6:
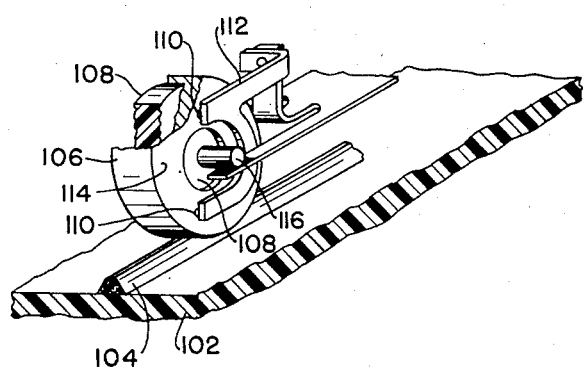
Figure 6 shows, isometrically and partially broken away, a contact making means of this invention.
Figure 7:
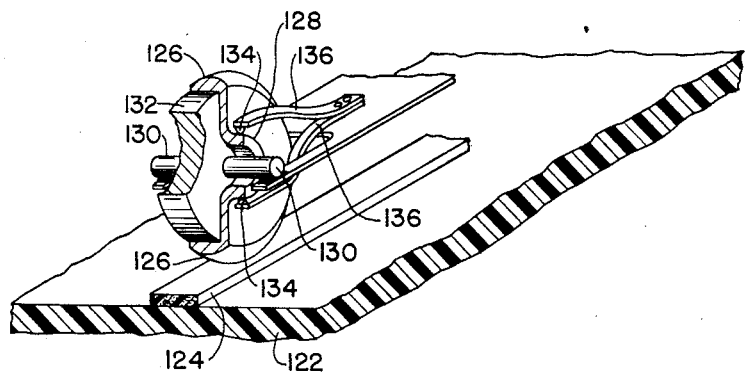
Figure 7 shows isometrically and partially broken away a roller type contact device.

In Figures 6 and 7 alternative embodiments of this invention incorporating bushing type bearings are shown.

Referring now to Figure 6 there is shown an insulator plastic base 102 upon which is supported a resistance track 104. Rolling on track 104 is a silver tire 106 provided with a side flange 114. Against side flange 114 is an electrical contact button 110 made of a suitable precious metal material such as 90% platinum and 10% palladium or other contact material suitable for use with the flange material where it is other than silver. Contact button 110 is maintained in intimate contact with flange 114 by means of spring member 112. Conventional electrically conductive means may be provided between spring 112 and a potentiometer or other output terminal.

Metal tire 106 is mounted on polyfluoroethylene bushing 108 which in turn rotates about shaft 116. Shaft 116 is in turn supported by a conventional variable contact actuating means, such as brush block 40 shown in Figure 4, if the application be a potentiometer or other equivalent means in apparatus of other types requiring the employment of a movable electrical contact.

Still another embodiment is shown in Figure 7 wherein insulator base 122 supports a flat resistance track 124. In turn convex shaped tire formed of a suitable contact material such as silver rides on track 124.

It is to be noted that whereas in Figure 6 a flat tire is employed in combination with a convex track so as to avoid ambiguity of contact, in Figure 7 a flat track 124 is used in combination with a convex tire 126. Flange 128 is positioned concentric with shaft 130. Bronze bushing 132 supports tire 126 from shaft 130. A precious metal contact 134 attached to spring 136 serves as a take-off between cylinder 128 and a conventional output terminal (not shown).

What is claimed is:

1. A potentiometer comprising a resistance element, an electrical conductive roller arranged to roll along said resistance element, a contact member arranged to wipe said roller, and means to connect said contact member and said resistance element to external circuits.

2. A potentiometer comprising a resistance element, means to connect said resistance element to an external circuit, a bearing assembly, including an inner race and an outer race and a plurality of rotatable bearing members caged between said inner and outer races, an actuator shaft, means supporting said inner race from said actuator shaft, so that said outer race is in contact with said resistance element and capable of traversing said resistance element in accordance with the position of said actuator shaft, a contact member in contact with said outer race, means for connecting said contact member with an external circuit.

3. The potentiometer of claim 2 wherein said means for supporting of said inner race includes a spring member carried by said actuating shaft.

4. The potentiometer of claim 3 wherein said spring is provided with a leaf spring member to which is attached said contact member.

5. The potentiometer of claim 3 wherein said spring member is electrically isolated from said shaft by an insulator block.

6. A continuously rollable contact apparatus for making an electrically conductive circuit connection between a conductive surface and an external circuit consisting of a supporting shaft, an insulating plastic bushing rotatably mounted on said shaft, a metal tire adapted to roll on said conductive surface, mounted on said bushing, a metal wiper in continuous contact with said tire, spring means for maintaining said wiper in contact with said tire, and means to connect said wiper to said external circuit.

7. A movable electrical contact making apparatus comprising an actuating member, a shaft supported by said actuating member, a wheel having an electrically conductive tread and sidewall, said wheel mounted for rotation on said shaft, an electrically conductive side wall in electrical connection with said tread and at least one electrically conductive wiper contact mounted on a spring supported by said actuating member, said contact being positioned in constant contact with said side wall.

8. A movable electrical contact making apparatus comprising an actuating member, a shaft supported by said actuating member, a wheel having an electrically conductive tread, said wheel mounted on said shaft, a wiper member supported by said actuating member, a contact carried by said wiper member, an electrically conductive cylindrical member rotatably mounted coaxially with said shaft and positioned so as to be continuously contacted by said contact and conductive means electrically connecting said tread and said cylinder.

9. In a potentiometer the combination comprising a supporting base, a resistive track carried by said base, an electrically conductive track carried by said base, an actuating arm, an insulator carried by said actuating arm, a first spring member attached to said insulator, a contact member carried by said first spring member and arranged to traverse said electrically conductive track, a second spring member electrically connected to said first spring member, a shaft carried by said second spring member, a wheel rotatably mounted on said shaft and provided with an electrically conductive tread in contact with said resistance track, a third spring member, a contact carried by said third spring member, said contact being in contact with said electrically conductive tread.

10. In a potentiometer the combination comprising a supporting base, a resistive track carried by said base, an electrically conductive track carried by said base, an actuating arm, an insulator carried by said actuating arm, a first spring member attached to said insulator, a contact member carried by said first spring member and arranged to traverse said electrically conductive track, a second spring member electrically connected to said first spring member, a shaft carried by said second spring member, a wheel rotatably mounted on said shaft and provided with an electrically conductive tread in contact with said resistance path and annular disc arranged to rotate about said shaft, said tread and said disc being electrically interconnected; a third spring arm extending from said second spring arm, a contact member carried by said third spring arm engaging said electrically conductive annular disc.

11. A potentiometer comprising a supporting base, a resistive track carried by said base, output terminals carried by said base in electrical connection with said resistive track, an actuating arm adapted to be moved proximate to and parallel to said resistive track, an electrical insulator carried by said arm, a first spring mounted on said electrical insulator, a shaft rigidly mounted on and projecting from said spring, a rotatable member disposed on said shaft and rotatable thereon, an electrically conductive roller formed about the periphery of said rotatable member and abutting therewith, said roller being biased by said first spring to roll in electrical connecting relation on said resistance path as said actuator arm is moved, a second spring mounted on said insulator and adapted to abut and wipe said electrically conductive roller, said second spring being independent of and bypassing said rotatable member, and means to connect said second spring to an external circuit.

12. A device as in claim 11 wherein said rotatable member is electrically non-conductive.

13. A device as in claim 11 wherein said rotatable member includes ball bearings.

14. A device as in claim 11 wherein said first spring and said second spring are joined to define a Y shaped unitary structure, the base portion thereof being mounted on said electrical insulator, one arm thereof mounting said shaft, and the other arm thereof being adapted to wipe said conductive roller.

15. A continuously rollable contact apparatus for making an electrically conductive circuit connection between a conductive surface and an external circuit consisting of a supporting shaft, an insulating plastic bushing rotatably mounted on said shaft, a convex metal tire, adapted to roll on said conductive surface, mounted on said bushing, a metal wiper in continuous contact with said tire, spring means for maintaining said wiper in contact with said tire and means to connect said wiper to said external circuit.

16. A continuously rollable contact apparatus for making an electrically conductive circuit connection between a conductive surface and an external circuit consisting of a supporting shaft, an insulating plastic bushing rotatably mounted on said shaft, a precious metal tire, adapted to roll on said conductive surface, mounted on said bushing, a metal wiper in continuous contact with said tire, spring means for maintaining said wiper in contact with said tire, and means to connect said wiper to said external circuit.

References Cited in the file of this patent

UNITED STATES PATENTS

| | | |
|---|---|---|
| 2,120,771 | Thompson | June 14, 1938 |
| 2,135,809 | Fruth | Nov. 8, 1938 |
| 2,186,154 | Stoekle | Jan. 9, 1940 |
| 2,473,048 | Beckman | June 14, 1949 |
| 2,549,389 | Rosenberg | Apr. 17, 1951 |
| 2,595,189 | Dewan | Apr. 29, 1952 |